(12) United States Patent
Wolf

(10) Patent No.: US 7,979,839 B2
(45) Date of Patent: Jul. 12, 2011

(54) METHOD FOR EMPLOYING THE COMPUTER IN THE CREATIVE ACT OF PROGRAMMING

(76) Inventor: William M. Wolf, Rockport, MA (US)

( * ) Notice: Subject to any disclaimer, the term of this patent is extended or adjusted under 35 U.S.C. 154(b) by 450 days.

(21) Appl. No.: 11/836,228

(22) Filed: Aug. 9, 2007

(65) Prior Publication Data

US 2008/0052669 A1  Feb. 28, 2008

Related U.S. Application Data

(60) Provisional application No. 60/839,390, filed on Aug. 23, 2006.

(51) Int. Cl.
*G06F 9/44* (2006.01)
(52) U.S. Cl. .......................... 717/100; 717/114
(58) Field of Classification Search .................. None
See application file for complete search history.

(56) References Cited

U.S. PATENT DOCUMENTS

| | | | |
|---|---|---|---|
| 5,671,415 A * | 9/1997 | Hossain | 717/101 |
| 6,003,143 A | 12/1999 | Kim et al. | |
| 6,016,474 A | 1/2000 | Kim et al. | |
| 6,021,272 A | 2/2000 | Cahill et al. | |
| 6,025,501 A | 2/2000 | Ulmer et al. | |
| 6,026,362 A | 2/2000 | Kim et al. | |
| 6,035,422 A | 3/2000 | Hohl et al. | |
| 6,038,378 A | 3/2000 | Kita et al. | |
| 6,052,515 A | 4/2000 | Brauckhaus | |
| 7,073,134 B1 * | 7/2006 | Ogami | 715/765 |
| 2005/0010912 A1 * | 1/2005 | Adolphson et al. | 717/151 |

OTHER PUBLICATIONS

Christopher Hundhausen et al., "What You See is What You Code: A Radically Dynamic Algorithm Visualization Development Model for Novice Learners", Sep. 2005, Proceedings of the 2005 IEEE Symposium on Visual Languages and Human-Centric Computing.*
The Hudson Group, "HWeb Agent Function Keys—Hot Keys for Quick Lookup", Feb 2005, http://knowledgebase.hudsonltd.com/article.php?id=061.*
Larry Seltzer et al., "Microsoft Office 2000 Developer", Jan. 2000, http://windowsitpro.com/article/articleid/7766/microsoft-office-2000-developer.html.*

(Continued)

*Primary Examiner* — Wei Zhen
*Assistant Examiner* — Lanny Ung
(74) *Attorney, Agent, or Firm* — Nutter McClennen & Fish LLP; David J. Powsner

(57) ABSTRACT

A method is described which permits a computer programmer to write a program with the assistance of the computer itself. The computer will provide instant feedback, following the procedures herein described, to the result of performing each instruction. Therefore, the programmer may instantaneously observe the working of the program as the computer will perform it. Thus any difference in the result produced by the computer from what the programmer expects to happen may be recognized and, if appropriate, corrected. In a higher order implementation of this method the computer will display icons to link the in-process programming to a working routine resident on a remote computer. Thus, the tools and benefits of so-called Service Oriented Architecture (SOA) can be made available to the programmer. Employing the method of this invention, the computer becomes an integral part of the creative process of writing a program.

19 Claims, 10 Drawing Sheets

---

SAMPLE PROGRAM

This is a Sample Program. It is intended to place the sum of the values A,B,and C stored in registers 314a, 314b, and 314c, respectively, into memory location 3141.

STEP 1   MOV AL,314a

Before Display
Display of AL as an accumulator                         AL: 00000000
Display of 314a as a register containing A              314a: 0000000A

EXECUTE

After Display
Display of Accumulator AL containing A                  AL: 0000000A
Display of 314a containing A                            314A: 0000000A OK TO PROCEED?    NO  →  to Screen 1.0
                  YES →  to Next step

STEP 2   ADD AL,314b

Before Display
Display of AL containing A                              AL: 0000000A
Display of 314b as a register containing B              314b: 0000000B

EXECUTE

After Display
Display of Accumulator AL containing A+B                AL: 00000A+B
Display of 314b containing B                            314b: 0000000B OK TO PROCEED?    NO  →  to Screen 1.0
                  YES →  to Next step

OTHER PUBLICATIONS

Niko Myller, "The Fundamental Design Issues of Jeliot 3", Feb. 2004.*

"The Benefits of a Service-Oriented Architecture", Michael Stevens, May 7, 2002.*

Intel® 64 and IA-32 Architectures Software Developer's Manual, vol. 1: Basic Architecture, 494 pages, Order No. 253665-025US, Nov. 2007.

Intel® 64 and IA-32 Architectures Software Developer's Manual, vol. 2A: Instruction Set Reference, A-M, 804 pages, Order No. 253666-025US, Nov. 2007.

Intel® 64 and IA-32 Architectures Software Developer's Manual, vol. 2B: Instruction Set Reference, N-Z, 764 pages, Order No. 253667-025US, Nov. 2007.

Intel® 64 and IA-32 Architectures Software Developer's Manual, vol. 3A: System Programming Guide, Part 1, 646 pages, Order No. 253668-025US, Nov. 2007.

Intel® 64 and IA-32 Architectures Software Developer's Manual, vol. 3B: System Programming Guide, Part 2, 670 pages, Order No. 253669-025US, Nov. 2007.

Intel® 64 and IA-32 Architectures Optimization Reference Manual, 512 pages, Order No. 248966-016US, Nov. 2007.

* cited by examiner

SCREEN 1.0 PROGRAM FLOW

SCREEN 2.0 PROGRAM FLOW

INSTRUCTION LIST

- DATA TRANSFER
- BINARY ARITHMETIC
- DECIMAL ARITHMETIC
- LOGIC
- SHIFT AND ROTATE
- BIT AND BYTE
- CONTROL TRANSFER
- STRING
- FLAG CONTROL
- SEGMENT
- MISCELLANEOUS

---

REMOTE ROUTINE ICONS

ICON NO. 1 – SORT ROUTINE BY CATEGORY XYZ

ICON NO. 2 – JUST IN TIME INVENTORY COMPUTATION + UPDATE

ICON NO. 3 – DEPARTMENTAL INCENTIVE COMPUTATIONS FOR HOURLY AND SALARIED EMPLOYEES WORKING IN PA

ICON NO. 4 – PAYROLL COMPUTATIONS FOR EMPLOYEES WORKING IN CA

ICON NO. 5 – STATE TAX COMPUTATION FOR SALES TO MA CUSTOMERS

ETC.

FIG. 6

BINARY ARITHMETIC INSTRUCTIONS

- ADD   Add                   *detail*
- ADC   Add with carry        *detail*
- SUB   Subtract              *detail*
- SBB   Subtract with borrow  *detail*
- MUL   Unsigned Multiply     *detail*
- IMUL  Signed Multiply       *detail*
- DIV   Unsigned divide       *detail*
- IDIV  Signed Divide         *detail*
- INC   Increment             *detail*
- DEC   Decrement             *detail*
- NEG   Negate                *detail*
- CMO   Compare               *detail*

FIG. 7

ADD INSTRUCTION DETAILED

ADD - The ADD instruction adds the source operand (second operand) to the destination operand (first operand) and then stores the result in the destination operand. The destination operand can be a register or a memory location; the source operand can be a register, or a memory location, or an immediate value.

For example,

>ADD *destination , source*

After the operation is performed, the *destination* contains the sum while the *source* remains unchanged. It is important to recognize that two memory operands cannot be used in one instruction. When an immediate value is used as a source operand, it is sign-extended to the length of the destination operand format.

The ADD instruction evaluates the result for both signed and unsigned integer operands and sets the OF and CF flags to indicate a carry (overflow) in the signed or unsigned result. The SF flag indicates the sign of the signed result.

FIG. 8

SAMPLE PROGRAM

This is a Sample Program. It is intended to place the sum of the values A, B, and C stored in registers 314a, 314b, and 314c, respectively, into memory location 3141.

<u>STEP 1</u>      MOV AL, 314a

<u>Before Display</u>
    Display of AL as an accumulator                                           AL:    00000000
    Display of 314a as a register containing A                               314a:  0000000A

EXECUTE

<u>After Display</u>
    Display of Accumulator AL containing A                                     AL:    0000000A
    Display of 314a containing A                                                                  314A:  0000000A OK TO PROCEED?        NO  →    to Screen 1.0

YES  →    to Next step

<u>STEP 2</u>      ADD   AL, 314b

<u>Before Display</u>
    Display of AL containing A                                                             AL:    0000000A
    Display of 314b as a register containing B                               314b:  0000000B

EXECUTE

<u>After Display</u>
    Display of Accumulator AL containing A+B                          AL:    00000A+B
    Display of 314b containing B                                                         314b:  0000000B OK TO PROCEED?        NO  →    to Screen 1.0

YES  →    to Next step

FIG. 9A

STEP 3     ADD   AL,314c

Before Display
Display of AL containing the sum of A+B      AL:   00000A+B
Display of 314c as a register containing C      314c: 0000000C

EXECUTE

After Display
Display of AL containing the sum of A+B+C      AL:   0000A+B+C
Display of 314c containing C      314c: 0000000C OK TO PROCEED?     NO   →     to Screen 1.0

YES  →    to Next step

STEP 4     MOV  3141,AL

Before Display
Display of AL containing the sum of A+B+C      AL:   0000A+B+C
Display of 3141 as an empty register      3141: 00000000

EXECUTE

After Display
Display of AL containing A+B+C      AL:   0000A+B+C
Display of 3141 containing A+B+C      3141: 0000A+B+C OK TO PROCEED?     NO   →     to Screen 1.0

YES  →    to Next step

STEP 5

Exit this routine or continue programming.

FIG. 9B

METHOD FOR EMPLOYING THE COMPUTER IN THE CREATIVE ACT OF PROGRAMMING

REFERENCE TO RELATED APPLICATIONS

This application claims the benefit of priority of U.S. Provisional Patent Application Ser. No. 60-839,390 filed Aug. 23, 2006 (entitled "Method for Employing the Computer in the Creative Act of Programming"), the teachings of which are incorporated herein by reference.

BACKGROUND OF THE INVENTION

Throughout the fifty year history of modern computing much of computer research and development has been focused on producing computers that are faster, smaller, and cheaper while consuming less power and providing more storage. Comparatively little has been spent on research and development in the art/science of programming. In the early days, the cost of building a computer was much greater than the cost of programming it. Today, the converse is true. One may purchase a computer for under $1,000 which is more powerful than one that cost over $1,000,000 forty years ago.

The conventional method of programming is described as a series of steps:
1) PROGRAM SPECIFICATION—Determine the precise arithmetic and logical procedures you want the program to perform, covering all possibilities.
2) FLOW DIAGRAM—Construct a logical flow diagram, which portrays the order of program procedures.
3) WRITING OF PROGRAM—write code in either a higher order language or in assembler or machine language.
4) TESTING—Debug the program by testing in stepwise fashion against known or separately derived data.
5) REMEDIATION—Correct the errors that are uncovered in the testing process.
6) TESTING CYCLE—Iterate through steps 4) and 5) above until no further corrections appear to be necessary.

Steps 4) through 6) are sometimes referred to as an "alpha" test. A follow-on procedure is to test the program against "live" data to see how the program performs in the environment for which it was written. This is generally referred to as a "beta" test.

Even after the program has undergone extensive testing there may be a set of data and/or circumstances encountered in real life which result in unanticipated possibilities and the program may fail or produce faulty results which may impact other systems and procedures.

Various efforts have addressed the difficult process of programming by building interpreters and compilers and pseudo languages all of which incorporate several computer instructions in their usage. These efforts and others are directed toward one goal. That is to alleviate the programming chore and allow the programmer to write more correct programs faster and more accurately. Of course, any increase in programmer productivity carries with it a consequent reduction in expense.

One of the questionable software practices that have evolved through the years is the complexity of the computer instructions. It seems as though each computer manufacturer feels that bigger is better. That is, the more instructions one allows the programmer, the more choices he has, the better.

In Whirlwind I, the early MIT computer on which was programmed the prototype for our nation's Air Defense System—SAGE (Semi-Automatic Ground Environment), the complete order code was 32 instructions. In Volume 1 of the INTEL Architecture Software Developer's Manual there are listed 50 Data Transfer Instructions, each distinctly different, one from another.

Consider the following examples of the Data Transfer Instruction—

| | DESCRIPTION |
|---|---|
| WHIRLWIND I | |
| TS | Transfer to Storage |
| INTEL PENTIUM | |
| MOV | Move |
| CMOVE/CMOVZ | Conditional move if equal/Conditional move if zero |
| CMOVNE/CMOVNZ | Conditional move if not equal/Conditional move if not zero |
| CMOVA/CMOVNBE | Conditional move if above/Conditional move if not below or equal. |
| CMOVAE/CMOVNB | Conditional move if above or equal/Conditional move if not below |
| CMOVB/CMOVNAE | Conditional move if below/Conditional move if not above or equal. |
| CMOVBE/CMOVNA | Conditional move if below or equal/Conditional move if not above. |
| CMOVG/CMOVNE | Conditional move if greater/Conditional move if not less or equal. |
| CMOVGE/CMOVNL | Conditional move if greater or equal/Conditional move if not less. |
| CMOVL/CMOVNGE | Conditional move if less/Conditional move if not greater or equal. |
| CMOVLE/CMOVNG | Conditional move if less or equal/Conditional move if not greater. |
| CMOVC | Conditional move if carry. |
| CMOVNC | Conditional move if not carry. |
| CMOVO | Conditional move if overflow. |
| CMOVNO | Conditional move if not overflow. |
| CMOVS | Conditional move if sign (negative) |
| CMOVNS | Conditional move if not sign (non-negative) |
| CMOVP/CMOVPE | Conditional move if parity/Conditional move if parity even. |
| CMOVNP/CMOVPO | Conditional move if not parity/Conditional move if parity odd. |
| XCHG | Exchange |
| BSWAP | Byte swap. |
| XADD | Exchange and add. |
| CMPXCHG | Compare and exchange. |
| CMPXCHG8B | Compare and exchange 8 bytes. |
| PUSH | Push onto stack. |
| POP | Pop off of stack. |
| PUSHA/PUSHAD | Push general-purpose registers onto stack. |
| POPA/POPAD | Pop general-purpose registers from stack. |
| IN | Read from a port. |
| OUT | Write to a port. |
| CWD/CDQ | Convert word to doubleword/Convert doubleword to quadword. |
| CBW/CWDE | Convert byte to word/Convert word to doubleword in EAX register. |
| MOVSX | Move and sign extend. |
| MOVZX | Move and zero extend. |

This is but one example of the complexity to which programming has evolved over the years. In recent years, programming practice has embraced a new way of incorporating proven applications software into original programming. This method, termed Service Oriented Architecture, or SOA, has enabled many new applications to be built rapidly employing old, debugged, proven software from the past. In large organizations with a substantial IT department, it is becoming increasingly popular to standardize on functional subroutines which may be called by individual computer workstations and delivered for inclusion in the writing of a given application. It is also becoming popular to have IT companies such as H-P and IBM provide access to standardized subroutines via the Internet or other means of on-line communication. As is the current custom, the subroutines may be resident on another, remote, computer different from the resident machine wherein the subject program is being written.

Others may argue the advantage or disadvantage of offering so many choices. Suffice it to say that programming has become so complex that one needs help in extracting appropriate instructions from the plethora of possible combinations to perform a given function.

The invention described herein addresses the programming process from a unique perspective which is different from any that have been previously designed and implemented. The adoption and use of this method should lead to increased productivity, thus reduced cost of programming, by enabling the programmer to more quickly produce more accurate programs.

SUMMARY OF THE INVENTION

The foregoing are among the objects attained by the invention which provides, in one aspect, a method of facilitating the writing of a computer program comprising the steps of graphically displaying one or more program instructions of a computer program being written, and graphically displaying a result of executing said program instructions, wherein that result includes data from computer locations affected by execution of the program instructions. The method further includes inserting a temporary program instruction into the computer program that is being written, and displaying a result of executing that computer program, along with the temporary program instruction, wherein the result includes data from computer locations affected by such execution. The temporary program instruction is accepted or rejected, e.g., by a programmer, and any accepted instruction is permanently added to the computer program.

In another aspect of the invention, methods as described above include accepting the temporary program instruction by a programmer striking a designated key on a keyboard. In a related aspect of the invention, the method includes eliminating the temporary instructions from the computer program when rejected, e.g., by a programmer.

In another aspect of the invention, methods as described above include displaying a result of executing the program instructions, and/or the computer program with the temporary instruction, wherein the result includes data from any of one or more accumulators, registers, or stacks affected by execution of the program instructions and temporary program instructions.

In yet another aspect of the invention, methods as described above include repeating the aforementioned steps, e.g., displaying the program instructions, inserting temporary instruction, accepting or rejecting the temporary instructions, etc., until the computer program being written is satisfactorily completed. In a related aspect of the invention, the steps are repeated until an exit point condition is satisfied, e.g., before the program is complete.

In another aspect of the invention, methods as described above include displaying on a first screen a list of one or more program instructions, and selecting the temporary program instruction from that list for insertion into the computer program being written.

In another aspect of the invention, methods as described above include displaying on a second screen one or more program instructions of the computer program being written, and also displaying on the second screen the temporary instruction inserted into the computer program being written.

In yet another aspect of the invention, methods as described above include displaying on a third screen the results of the program instruction execution, and also displaying on the third screen the results of executing the computer program that is being written, along with the temporary program instruction.

In another related aspect of the invention, methods as described above include displaying on a fourth screen a flow diagram that represents a relationship between any of (i) an accepted temporary program instruction, (ii) a rejected temporary program instruction, and (iii) the computer program as a whole. In a related aspect of the invention, the flow diagram represents an interconnection of code blocks within the computer program.

In another aspect of the invention, methods as described above include displaying the results of executing the program instructions and executing the computer program, along with the temporary instruction, as elements of the flow diagram in order for a programmer to more easily observe a progression of the computer program being written. In a related aspect of the invention, the method includes displaying the flow diagram in a cascading structure.

In another aspect of the invention, methods as described above include displaying program instructions to a first programmer and a second programmer who are writing the computer program, and requiring both programmers to accept a temporary instruction in order that it be permanently added to the computer program. In a related aspect of the invention, such methods provide for display of the program instructions to (and receipt of acceptances from) programmers who are geographically separated from one another.

Further aspects of the invention provide systems to facilitate the writing of computer programs that operate in accord with the methods described above.

Systems and methods of the present invention, e.g., as described above, support a novel way of approaching the technique of programming. In the example below, which highlights still further aspects of the invention, it will be assumed that the programmer utilizing methods and/or systems according to the invention is writing in machine language. However, the principles and method prevail regardless of the language in which the program is being written.

The machine language, that is, the basic instructions available to the programmer for writing the program, are displayed on a console for the programmer's convenience. In one aspect of this invention he will employ a so-called light pen—a device that detects light from a first display console—to select a given instruction (for operational convenience, the pronoun "he" shall represent both "he" and "she"). Also displayed are icons used to call working subroutines from remote locations. He then uses the light pen to insert the instruction or icon onto a second console upon which his program is being written. Then with a further use of the light pen he selects the argument portion of the instruction and indicates that that line is completed. The computer will embolden the pertinent portions of these displays indicating successful transfers.

The computer, on a third console, will then display for the programmer's consideration the result of performing that instruction or subroutine. There will be a "before" and "after" segmentation on that display. The programmer will then consider whether or not his selection of instruction and arguments(s) or calling of subroutine is correct.

If incorrect, the programmer will return to the first and second consoles to make whatever corrections are required. He will then observe the result on the third console and will repeat this process until he has written a correct instruction or called a useful subroutine. When satisfied, the programmer will so indicate and proceed with the next instruction.

A fourth console is available for the programmer to follow the "big picture"—a flow diagram of the program being written—which will allow the programmer to indicate his progress through the instructions that he is writing in the course of his programming. Since the programmer immediately sees the in-computer result of performing each instruction the necessity for subsequent testing and remediation is greatly reduced to the point of being virtually eliminated.

That is, as a programmer writes an instruction using the computer as a writing assistant, the computer immediately displays the result of performing that instruction or subroutine. The feedback is instantaneous and the programmer can correct any errors at once, before they proliferate. Gone is the question in the programmer's mind with respect to whether or not the instruction will perform as intended—or as the manual suggests it will perform.

Further aspects of the invention provide methods and systems as described above that additionally utilize SOA. Thus, for example, methods and systems as described above that include supplementing the computer language, e.g., as presented on Screen 1 in the example above, with a collection of designated icons to call standard subroutines for inclusion in the program being written. Under the programmed selection a given subroutine will be executed and the results of performing it will be displayed.

The result is that the new programming process is faster, thus cheaper, and more accurate, all appreciated goals in working in this field of ever-increasing productivity demands.

BRIEF DESCRIPTION OF THE ILLUSTRATED EMBODIMENT

A more complete understanding of the invention may be attained by reference to the drawings, in which:

FIG. 6 depicts a typical display on Screen 1—INSTRUCTION LIST PLUS ICONS FOR CALLING OTHER ROUTINES in a system according to the invention;

FIG. 7 depicts a typical display on Screen 1—BINARY ARITHMETIC INSTRUCTION in a system according to the invention;

FIG. 8 depicts a typical display on Screen 1—ADD INSTRUCTION DETAILED in a system according to the invention; and FIG. 9A-B depict a display of a SAMPLE PROGRAM illustrating "before" and "after" execution in a system according to the invention.

DETAILED DESCRIPTION OF THE ILLUSTRATED EMBODIMENT

Figure 1:
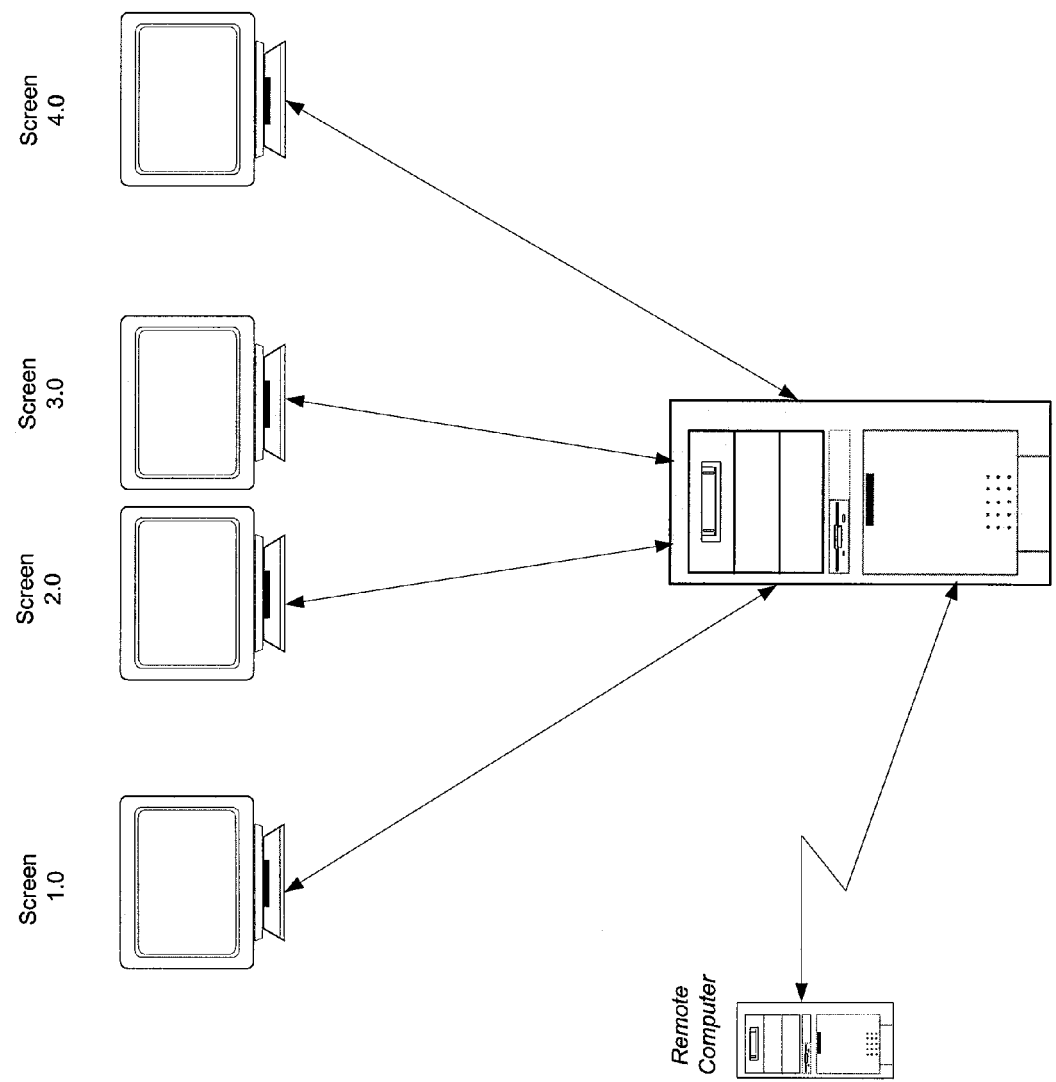
FIG. 1 depicts (i) an equipment configuration of a system according to the invention including four consoles all connected to a central processor and arranged in a convenient working relationship to the programmer, and (ii) the central processor's on line connection to a remote computer.

Referring to FIG. 1, it is seen that in a system according to the invention there are available to the programmer a sequence of four computer consoles all connected to the central computer. These consoles (or "screens"), which may be of the conventional variety known in the art, may be placed on a conventional desk in semi-circular fashion. Alternatively, they may be mounted below a flat surface that is 28 inches above the floor with their faces at an angle of about 30 to 40% above horizontal if this proves to be more convenient for the programmer. The configuration should take into account the ergonomics of the situation such that the programmer is most comfortable working with the four screens. For the purposes of this description, the screens are numbered 1.0, 2.0, 3.0, and 4.0 from left to right. Also depicted is the central computer's on line connection to a remote computer wherein may lie other routines to be added to the programmer's program. [Note—the light pen is the preferred mechanism for use in this invention. However, the mouse or other input device would work equally well and might be preferred by some.] The computer shown in FIG. 1 may also be of the conventional type known in the art—albeit configured for operation in accord with the teachings hereof.

Screen 1.0

In a typical configuration of the method, SCREEN 1.0, the Reference Screen, would contain the pertinent information including the order code of the computer for which the programmer is writing as well as icons to call pertinent subroutines, functions or other invocable programming entities (collectively, "subroutines" unless otherwise evident from context).

Figure 2:
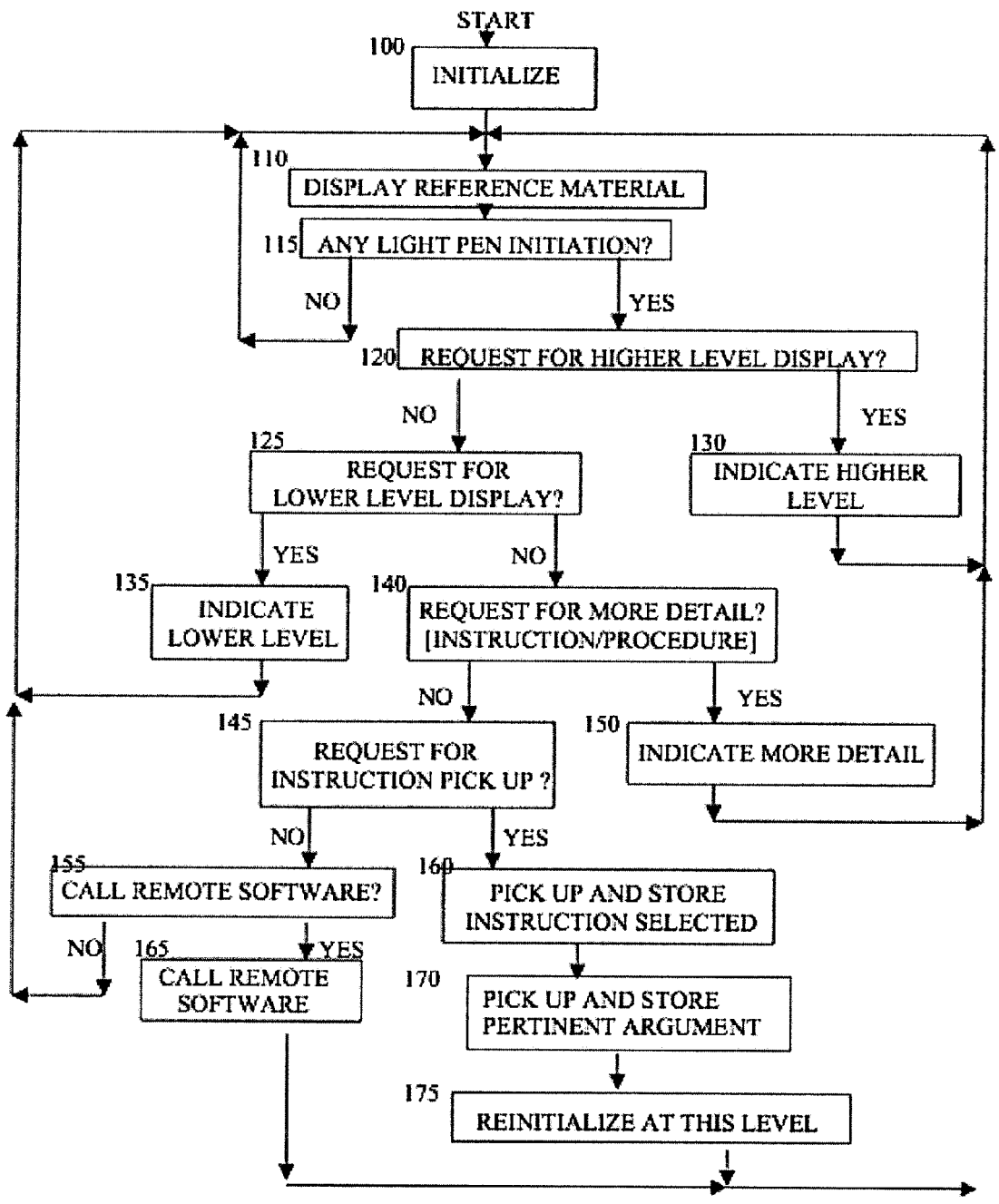
FIG. 2 depicts a typical flow diagram of the core procedures of Screen 1.0 in a system according to the invention.

The program flow diagram of SCREEN 1.0 is presented in FIG. 2. In Step 100, initialization takes place wherein all of the pertinent registers are set to their initial or appropriate values. Following this initialization, in Step 110, all of the reference material is displayed. This includes the set of instructions available to the programmer. It is unlikely that all of the instructions may be displayed at once. Therefore, a level of information display is required with the highest level being the groups of instructions available. One example of this, from the *Intel Volume 1: Basic Architecture* is the following types of Integer Instructions:

| | |
|---|---|
| Data Transfer | Control Transfer |
| Binary Arithmetic | String Instructions |
| Decimal Arithmetic | Flag Control |
| Logic Instructions | Segment Instructions |
| Shift and Rotate | Miscellaneous |
| Bit and Byte Instructions | |

A typical display of these instruction types is illustrated in FIG. 6. FIG. 7 and FIG. 8 illustrate what might be displayed if the programmer selected "BINARY ARITHMETIC" (from FIG. 6) and then "ADD" (from FIG. 7).

SCREEN 1.0 of the illustrated embodiment may also display icons leading to call routines to provide access to subroutines resident on a remote computer. This employment of these subroutines will be engaged in accordance with practices currently termed Service Oriented Architecture, or SOA. This access, provided under the umbrella of those offered to the programmer, will greatly enhance his abilities to write more powerful software incorporating these tools with his ability to create original programs pertinent to his unique applications.

In addition, SCREEN 1.0 would display icons to refer to other types of programming information pertinent to this computer. This would include access to user's manuals and other helpful programming information, all of which would be stored on compact discs, a number of which would be available on line through a group of compact disc readers connected in parallel for easy reference. Retrieval of pertinent parts of this reference material will be achieved by an appropriate use of the light pen and display in an interactive mode.

Following the display of reference information the computer would ask, Step 115, whether or not any light pen initiation had taken place. If NO, then control reverts to a redisplay of reference material. If YES, then control passes to Step 120 where the question is asked—Is there a request for a higher level display than the one currently being displayed? If YES, the computer accounts for the fact that a higher level is desired and adjusts the display accordingly [Step 130], then returns to the display. If NO, the next question is asked [Step 125]—Is there a request for a lower level, more detailed, display than the one currently being displayed? If YES, the computer adjusts the display for the more detailed level of information [Step 135]. If NO, the question is then asked [Step 140]—Is there a specific request for more detail with respect to a given instruction or procedure? If YES, the computer retrieves and prepares for display more of the extended detail called for by the programmer [Step 150]. If NO, then the computer asks the question [Step 145]—Is this a request for instruction pick up? If YES, the given instruction is picked up from the instruction display and stored for subsequent use [Step 160]. Following this action [Step 170] the argument and/or other pertinent information particular to the selected instruction is picked up and stored with the instruction as an integral part therewith. There would then be a resetting of some display parameters at this level [Step 175], whence control would pass to Step 110. If the answer to the question of Step 145 is NO, then the computer asks if a call to remote software is requested [Step 155]. If NO, control reverts back to Step 110. If YES, then the remote software is called for [Step 165]. Following this action, control passes to step 220.

As noted above, in recent years, programming practice has embraced Service Oriented Architecture, or SOA, to enable new applications to be built rapidly employing old, debugged, proven software from the past. The illustrated embodiment incorporates SOA access by supplementing the computer language as presented on Screen 1 with a collection of designated icons to call standard subroutines for inclusion in the program being written. Under the programmed selection a given subroutine will be executed and the results of performing it will be displayed. A principal consideration in the employing of off-computer software is data format integrity. It is expected that in practice this implementation will lead to standardization of data formats for similar applications such as medical history information; banking and financial data; etc.

Screen 2.0

This screen is the screen where computer instructions are written. The program writing process begins, and ends, at the display on this screen.

Figure 3:
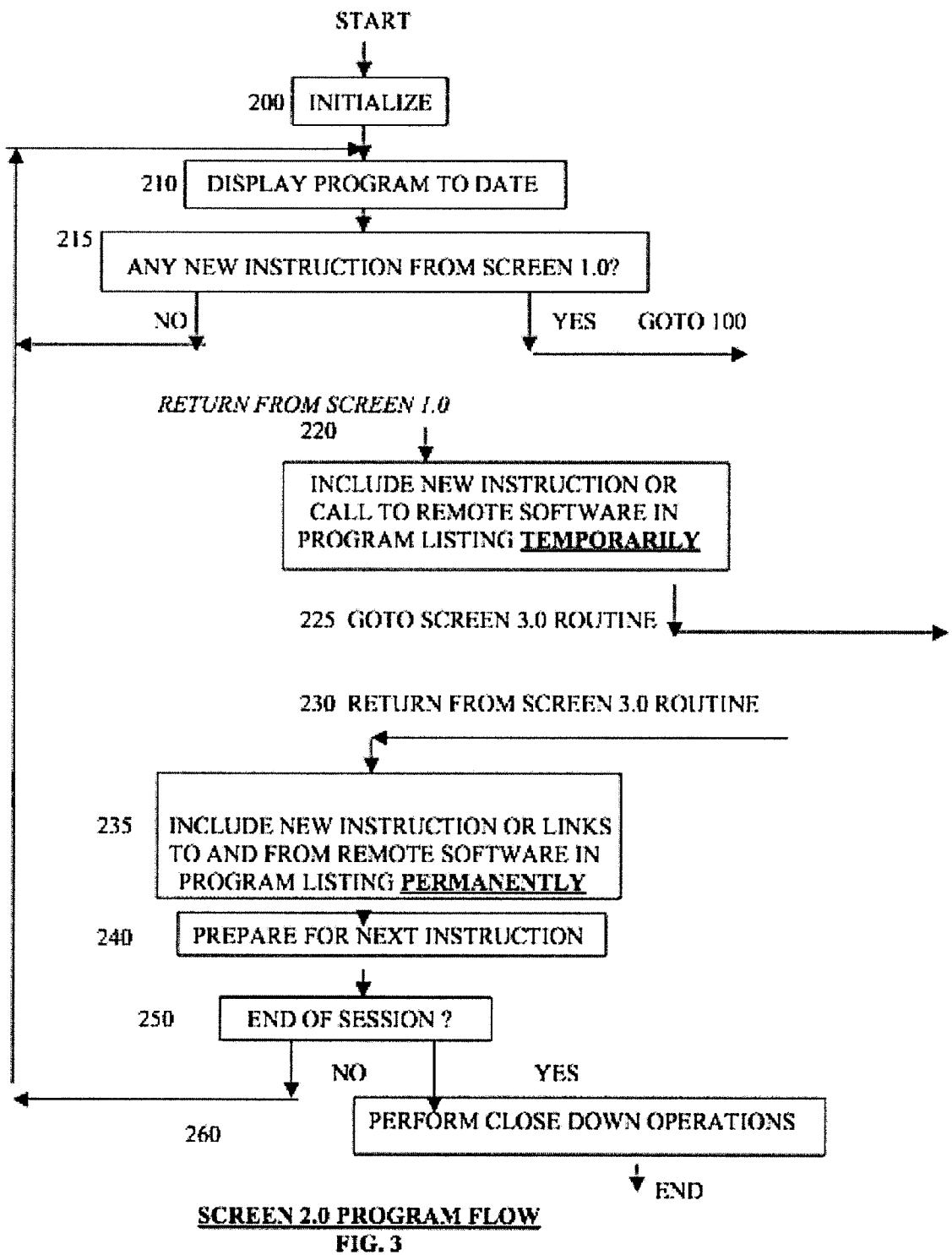
FIG. 3 depicts a typical flow diagram of the core procedures of Screen 2.0 in a system according to the invention.
Figure 4:
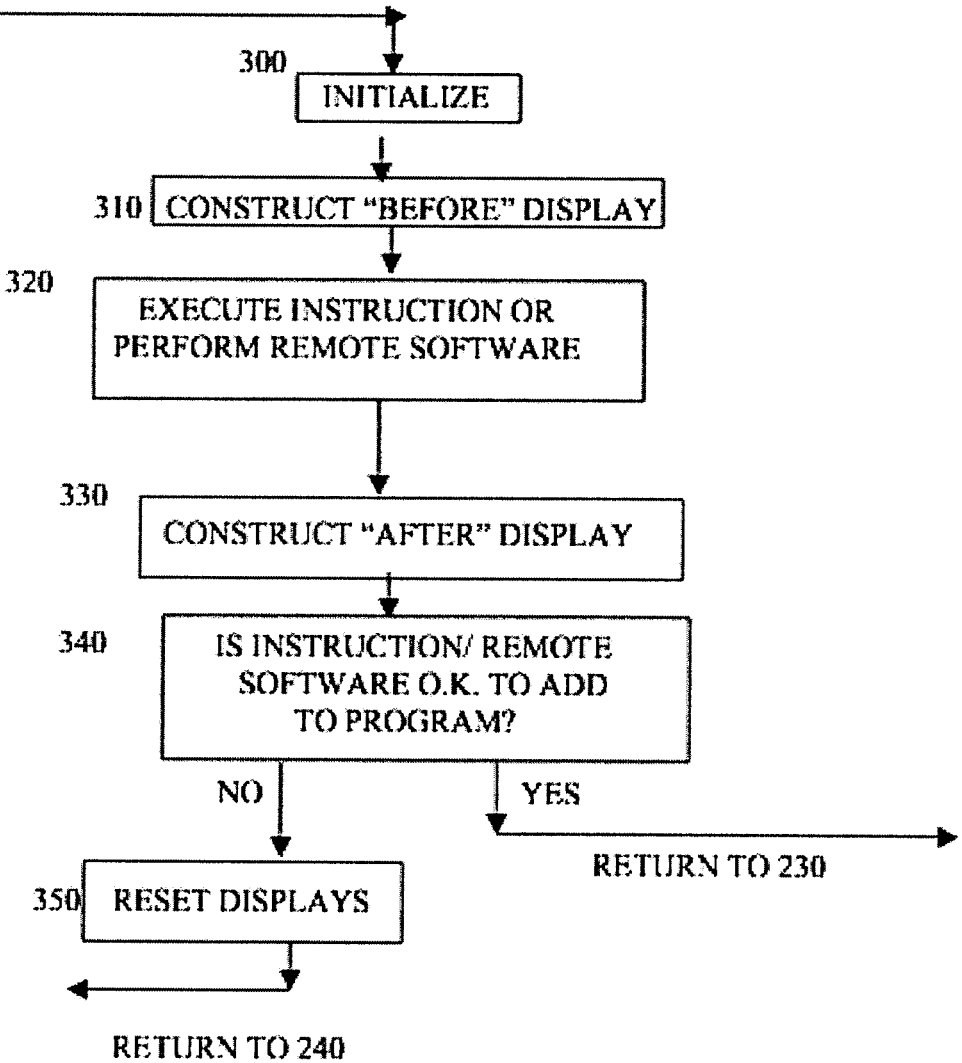
FIG. 4 depicts a typical flow diagram of the core procedures of Screen 3.0 in a system according to the invention.

Referring to FIG. 3, Initialization takes place at Step 200. Thence, a display of the program to date is presented at Step 210. At Step 215 the computer asks if there is any call for SCREEN 1.0 Input? In typical operation the programmer employs a light pen to indicate to the computer his desire to access SCREEN 1.0. If NO, control reverts back to the program to date display at Step 210. If the answer is YES, control reverts to SCREEN 1.0 were the programmer selects a new instruction (or a new subroutine) which is TEMPORARILY included in the Program Listing [Step 220]. From that step control transfers to the entry point Step 300 on SCREEN 3.0 [Step 225]. Following the processing of SCREEN 3.0, as represented in FIG. 4, the return takes place [Step 230], at which time the computer includes the new instruction or call to a subroutine in the Program Listing PERMANENTLY. Following the procedure steps are taken [Step 240] to prepare for selecting the next instruction. An exit point is then tested [Step 250] to determine whether or not the session should be ended. If the answer is NO, control reverts to 210. If YES, then close down and other functions such as program change summaries are performed [Step 260] before this session ENDs.

Modifications to this procedure may be operationally preferred. One illustration of this "before" and "after" sequence is illustrated in FIG. 9. What is important to incorporate is the enablement of the process to allow the programmer to observe the "before" and "after" results of performing each instruction before he accepts that instruction into his program. This is the essence of this procedure, allowing the programmer to observe the results and correct any mistakes of each instruction at the source!

Screen 3.0

The programmer observes the result of performing the instruction on SCREEN 3.0 where there is a "Before" section on the top half of the screen and an "After" section on the bottom half.

As previously mentioned, an alternative method for performing the functions of the above paragraph is to use the mouse for instruction selection and keyboard to type in the pertinent instructions and corresponding operands or arguments such as memory and register locations that are required to be specified by the instruction.

If the programmer approves of the portrayal of the "Before" and "After" instruction or subroutine performance in SCREEN 3.0 and, thus, wishes to insert the instruction or subroutine performance as he just composed or called it into his program he then indicates this approval by using the light pen to so indicate. At this time the programmer is prepared to select the next instruction and continue this creative, iterative process.

If the mouse and keyboard option is preferred, he may type an ENTER key to indicate satisfaction and that the computer should prepare for the next instruction. Referring to FIG. 4, Initialization takes place at Step 300. At Step 310 a "BEFORE" display is constructed. In the next step, Step 320, the Instruction that the programmer has just created is executed. If the requested action is to perform a subroutine, one iteration of this subroutine is performed. Following this execution an "After" display is constructed and displayed [Step 330]. It is important to recognize that all pertinent computer locations affected by this instruction be displayed in both the "Before" and "After" modes. This would include accumulators(s), storage registers, stacks, etc. if they are affected by the instruction's performance. The computer then asks the important question—May the Instruction be added to the Program [Step 340]? If YES, the control returns to SCREEN 2.0 at Step 225. If NO, the displays are reset [Step 350] and the control is returned to Step 240 on SCREEN 2.0 for another instruction to be selected.

Screen 4.0

On SCREEN 4.0 (FIG. 5) is displayed the "big picture". This can contain whatever suits the programmer enabling him to keep tract of what he is creating in the grand scheme of things. It may, for example, contain flow diagrams used to portray the interconnection of blocks of code. These flow diagrams can be of a cascading nature from the big picture of the project upon which the programmer is working down to a rather detailed portrayal of the task at hand. This detailed portrayal might have block numbers, which may correlate to the program being written. Conceivably, when a block has been completely coded, its display may have a contrasting color so that at a glance a programmer may observe progress and get positive feedback therefrom.

At the conclusion of a period of work the programmer may call for printouts which would range from the big picture down to detailed step-by-step instruction even including the "before" and "after" details for off-console contemplation and a historical record of what was done.

It is expected that the programmer would feel so comfortable with these tools that he would routinely try an instruction upon which he may have some doubt just to see what happens. This experiential capability would be greatly appreciated by programmers who have a natural aversion to reading the manual. Often, this is for understandable reasons. The most precious asset that a programmer has is his time. Any system or procedure that allows him to turn out more code faster and more correctly is certain to be embraced by him.

Figure 5:
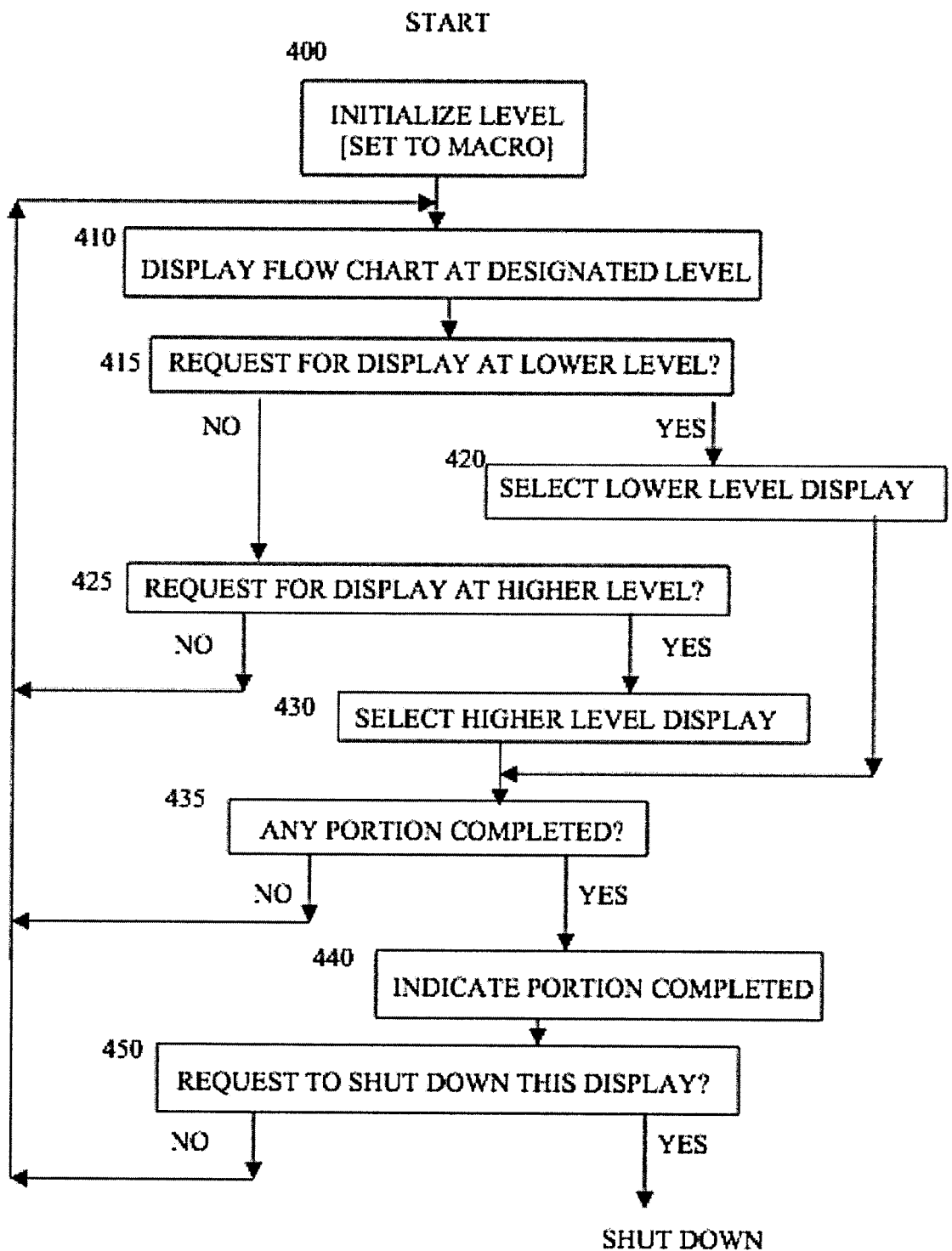
FIG. 5 depicts a typical flow diagram of the core procedures of Screen 4.0 in a system according to the invention.

Referring to FIG. 5, it is seen [Step 400] that initialization includes the setting of the flow diagrams to the macro level—that is, the major steps and their interrelation. At Step 410 the Flow Chart is displayed at the designated level. At Step 415 the question is asked whether or not the programmer is requesting that the display occur at a lower level. If NO, the program proceeds to Step 425. If YES, the corresponding lower level is selected for display [Step 420] and control passes to Step 435. At Step 425 the question is asked whether or not the programmer wishes the display to occur at a higher level? If NO, the control returns to Step 410. If YES, the corresponding higher level is selected for display [Step 430]. The consequent display will aid the programmer in recording his progress. Next, at Step 435, the question is asked as to whether or not any portion of the program as defined by the flow diagram has been completed? If NO, control reverts to Step 410. If YES, the program asks [Step 440] whether or not the programmer wishes to terminate this display. If NO, then control reverts to Step 410. If YES, this display is shut down.

In practice for certain programming environments it may be possible to combine the information and functions of Screen 2 and 3 into one screen. This would be an operational improvement. However, two screens were used in the description of this invention to allow for code complexity which may in practice overwhelm the single screen approach.

Collaborative Programming

The description of this invention focuses on one programmer and his man-machine interaction. It is technically possible and shall be considered a part of this invention to have a duplicate set of displays, both operating from the same central processor. This duplicate array may be programmed to perform collaborative programming. That is, one array will be considered a Master system while the other is termed the Collaborator system. Both systems will display the same information. However, before proceeding from one programming step to another, permission to proceed [Step 330 in the preceding] must be obtained from BOTH the Master and the Collaborator. This duality will permit a team programming procedure whereby two programmers must agree every step of the way.

More collaborators may be added and such addition is included in this patent but practice is expected to show that two should be sufficient for most working environments.

Training

Another valuable application for this patent is in the training of new programmers. In this method a student will take the role of Collaborator as described above and the teacher shall be the Master. After a sufficient training period, the two parties may switch roles to provide for the student to obtain supervised proficiency.

Distance Programming

Employing modem communications techniques the participants in the collaborative programming described above may be geographically separated, one from the other. Thus, so-called offshore programming may be monitored remotely resulting in more expeditious and economical operations in practice.

Shortcut

For the experienced, professional programmer, well versed in the language with which he is working, a short cut to the methods described herein may apply. That is, to allow the programmer to type into the computer his program, as is his current practice.

At the end of each line, as displayed on SCREEN 2.0, allow the programmer to stroke the ENTER key. When this is done, display (on either SCREEN 3.0 or 2.0, but preferably SCREEN 3.0) all of the information pertaining to the execution of that instruction—Accumulator(s), Contents of pertinent Registers, Stacks, etc. in both the "Before" and "After" states. The programmer may then study the potential results of performing his chosen instruction and either accept or reject.

If he rejects the results he should indicate to the computer by a definitive action. For example, depressing and holding down the Ctrl key while stroking the "r" (for reject) key. The instruction under consideration would then be eliminated and the programmer may then rewrite the instruction or take other appropriate action.

His acceptance may be actuated by something as simple (and fast) as stroking another ENTER key. The computer would then indicate its acceptance of that instruction and indicate to the programmer its readiness for him to write the next instruction.

What If/End If

Under appropriate circumstances it is possible, and is a part of this invention, to invoke this method by providing a new macro instruction to the programmer. That instruction is termed—
WHAT IF
and calls the programming environment described herein.
Upon completion of the programmer's use of this method he may correspondingly exercise an instruction termed—
END IF.
This will take the programmer out of the method herein described and into his previous programming environment.

This procedure may be found useful, for example, if one is inspecting and testing "old" programs in the hunt for errors. It may also be used to introduce modifications to "old," established programs.

Described above are methods and systems meeting the desired objects, among others. It will be appreciated that the embodiments described herein are merely examples of the invention, and that other embodiments incorporating changes thereto fall within the scope of the invention, of which I claim:

1. A method of facilitating writing a computer program comprising the steps of:
  A. graphically displaying one or more program instructions of a computer program being written, B. graphically displaying a result of executing said program instructions, wherein that result includes data from computer locations affected by execution of the program instructions, C. graphically displaying a list of one or more possible program instructions for the computer for which the computer program is being written, D. accepting a temporary program instruction selected by a user from the list of one or more program instructions for temporary insertion into the computer program being written, E. displaying (i) on a first segment of a display, a result of executing the computer program that is being written without insertion of the temporary program instruction and, at the same time, displaying (ii) on a second segment of the display, a result of executing the computer program with the temporary program instruction, wherein each such result includes data from computer locations affected by such execution, F. responding to user input accepting the temporary program instruction following such display in step (E) by permanently adding the temporary program instruction to the computer program.

2. The method of claim 1, wherein step (F) further comprises accepting the temporary program instruction by a programmer striking a designated key on a keyboard.

3. The method of claim 1, wherein step (F) further comprises eliminating the temporary instructions from the computer program when rejected.

4. The method of claim 1, wherein steps (B) and (E) include displaying data from any of one or more accumulators, registers, or stacks affected by execution of the program instructions and temporary program instructions.

5. The method of claim 1 further comprising repeating steps (A)-(F) until the computer program being written is satisfactorily completed.

6. The method of claim 1 further comprising iteratively repeating steps (A)-(F) until an exit point condition is satisfied.

7. The method of claim 1, wherein step (A) further comprises displaying on a second screen one or more program instructions of the computer program being written, and step (C) further includes displaying on the second screen the temporary program instruction inserted into the computer program being written.

8. The method of claim 7, wherein step (B) further comprises displaying on a third screen the results of the program instruction execution, and step (E) further comprises displaying on the third screen the results of executing the computer program that is being written, along with the temporary program instruction.

9. The method of claim 8 further comprising

G. displaying on a fourth screen a flow diagram that represents a relationship between any of (i) an accepted temporary program instruction, (ii) a rejected temporary program instruction, and (iii) the computer program as a whole.

10. The method of claim 8 further comprising

G. displaying on a fourth screen a flow diagram representing an interconnection of code blocks within the computer program.

11. The method of claim 9, wherein step G includes displaying the results of steps (B) and (E) as elements of the flow diagram in order for a programmer to more easily observe a progression of the computer program being written.

12. The method of claim 9, wherein step G includes displaying the flow diagram in a cascading structure.

13. A method of facilitating writing a computer program comprising the steps of:

A. graphically displaying to a first programmer and a second programmer, one or more program instructions of a computer program being written, wherein the first programmer and the second programmer are geographically separated, B. graphically displaying to the first programmer and the second programmer, a result of executing said program instructions, wherein that result includes data from computer locations affected by execution of the program instructions, C. graphically displaying to the first programmer and the second programmer a list of one or more possible program instructions for the computer for which the computer program is being written, D. permitting any of the first programmer and the second programmer to accept a temporary program instruction selected from the list of one or more program instructions for insertion into the computer program being written, E. displaying to the first programmer and second programmer (i) on first segments of displays associated to the first programmer and second programmer, a result of executing the computer program that is being written without insertion of the temporary program instruction and, at the same time, displaying (ii) on second segments of each of said displays, a result of executing the computer program with the temporary program instruction, wherein each such result includes data from computer locations affected by such execution, F. permitting the first programmer and the second programmer to accept or reject the temporary program instruction following such display in step (E) wherein the temporary program instruction is permanently added to the computer program when accepted by both the first programmer and the second programmer.

14. A method of facilitating writing a computer program incorporating Service Oriented Architecture comprising the steps of:

A. graphically displaying one or more program instructions of a computer program being written, the computer program incorporating Service Oriented Architecture, B. graphically displaying a result of executing said program instructions, wherein that result includes data from computer locations affected by execution of the program instructions, C. graphically displaying a list of one or more possible program instructions for the computer for which the computer program is being written, D. accepting a temporary program instruction selected by a user from the list of one or more program instructions for insertion into the computer program being written, E. displaying (i) on a first segment of a display, a result of executing the computer program that is being written without insertion of the temporary program instruction and, at the same time, displaying (ii) on a second segment of the display, a result of executing the computer program with the temporary program instruction, wherein each such result includes data from computer locations affected by such execution, F. responding to user input accepting the temporary program instruction following such display in step (E) by permanently adding the temporary program instruction to the computer program.

15. The method of claim 14, wherein step (D) further includes inserting a temporary program subroutine into the computer program being written by selecting an icon representing a standard program subroutine.

16. The method of claim 14, wherein step (D) further includes inserting a temporary program subroutine into the computer program being written by selecting, via the Internet or other on-line communication, a standard subroutine residing on a computer that is different from a machine wherein the computer program is being written.

17. The method of claim 1, wherein said one or more possible program instructions and said temporary program instruction are machine language program instructions.

18. The method of claim 13, wherein said one or more possible program instructions and said temporary program instruction are machine language program instructions.

19. The method of claim 14, wherein said one or more possible program instructions and said temporary program instruction are machine language program instructions.

\* \* \* \* \*